Patented May 24, 1949

2,470,764

UNITED STATES PATENT OFFICE 2,470,764

METHOD OF TREATING WASTE SULFITE LIQUOR

Thomas Leonidas Dunbar, Watertown, N. Y.

No Drawing. Application September 23, 1943,
Serial No. 503,559

10 Claims. (Cl. 92—11)

This invention relates to the production of pulp more particularly to an improved method of recovering and utilizing chemical values in waste sulphite liquor.

As is known, waste sulphite liquor represents a great loss in the sulphite pulp industry since it holds in solution much of the non-cellulosic material of the cell wall. This waster liquor contains the lignins of the wood, usually considered to be in the form of lignosulphonic acids. These lignin derivatives are in the colloidal state and when the liquor is directly treated with precipitating agents, such as calcium chloride, they are separated as amorphous precipitates which are different to filter. In addition to the lignin and sulphur dioxide, such liquor contains other constituents such as proteins, rosin and fat.

In view of the tremendous amounts of valuable, potentially recoverable material in this liquor and also in view of its tendency to pollute streams a great deal of research has been expended in attempting to recover valuable products therefrom. The attempts to utilize the waste liquor have largely been concerned with developing special uses such as binders, road binder liquor, briquetting coal and the like.

The present invention is concerned primarily with a method of recovering valuable constituents from sulphite waste liquor and directly utilizing these in the pulping process. The improvements contemplated herein may advantageously be utilized in a pulping process such as is described in my Patent 2,041,597. In the process described in this patent cellulosic material is digested with hot acid liquor and under such circumstances as to absorb and recover evolved gases in the digestion liquor. Increased recovery of the sulphur dioxide is insured by passing the spent liquor to a degassing tank and there subjecting it to a special treatment so as to evolve additional quantities of sulphur dioxide from the spent liquor. The liquor discharged from the degassing stage described in the patent may be treated according to the present invention. It will be understood however, that the invention is available for use with waste sulphite liquor from any mill.

Under the principle of the invention sulphite waste liquor is treated in a two stage process. In the first stage the liquor is subjected to the action of an oxidizing agent. For this purpose the bleach liquor normally in the pulp field may be utilized. In lieu of this, other active oxidizing agents such as hydrogen peroxide and the like may be utilized. The oxidizing agent may be added, preferably in the form of a solution, and may be thoroughly admixed with the sulphite liquor so as to insure homogeneous distribution therethrough.

To facilitate this action the liquor may be maintained at any desired temperature. As will be understood by those skilled in the art, the amount of the oxidizing agent which is employed is determined by the characteristics of the particular waste liquor which is to be treated. The composition of the liquor will, of course, vary considerably, depending upon such features as the type of wood treated, the extent of digestion or delignification and the like. Such waste liquors contain generally from 6% to 10% more or less ligneous matter. The quantity of the oxidizing agent used is calculated upon the ligneous content and may be empirically determined for any particular operation.

Such a treatment with, for example, a solution of calcium hypochlorite modifies the character of the liquor and effects the formation of a more or less gelatinous sludge or precipitate. This precipitate may be separated from the liquor in any suitable manner such as by filtration. It has been found that this separation of the sludge from the liquor tends to proceed rather slowly. This, however, may be accelerated by adding filter aids. A particularly effective and economical material for this purpose is sawdust. The sawdust functions not only to accelerate the filtering but also, due to its combustible character, facilitates burning of the sludge.

The resulting solution is then treated with sodium chloride so as to modify the fats and largely to precipitate out the lignin as the sodium salt. The amount of salt which is added, as will be appreciated, will vary considerably depending on the quantity of lignin in the liquor. A sufficient amount is added to salt out the lignin content as much as possible.

After such treatment the liquor may be separated from the precipitated matter in any suitable manner, such as by centrifugal separation which, if desired, may be facilitated by the addition of filtering aids such as cellulose pulp and the like. The use of cellulosic material as a filtering medium or a filtering aid in this step of the process presents special and unobvious advantages. For example, when kraft pulp or pulp produced by caustic soda cooking liquors is utilized it is found that such pulp has a special affinity for the suspended or dispersed lignin derivatives which are adhered or adsorbed on the pulp. The mechanism of such separation is hard to ascertain; it may be that this adsorptive affinity is due to a difference in the electric charge of the lignin derivaties of the pulp or that the separation is due to a positive chemical affinity between the two. Whatever may be the mechanism of the reaction it is found that after filtration the pulp used as a filtering medium is from about 15% to 20% heavier than the original pulp and that this material, fortuitously, is suitable for use in making unbleached kraft paper. This filtering step, therefore, is of dual utility in that it not only clarifies the treated liquor for subsequent reuse but it also provides a simple and cheap method for producing commercially useful kraft for paper making by chemically or physico-chemically extracting or adsorbing valuable constituents from acid liquors which were heretofore wasted.

The clear liquor produced by the above described filtration is then recycled in the process. For this purpose the clarified liquor may be passed to a storage vessel and then pumped either continuously or intermittently to the cold acid tank or to the pressure accumulator of the pulp unit to be mixed in suitable proportions with fresh acid liquor. If desired the clarified liquor may be pumped into the acid feed line between the cold acid tank and the pressure accumulator and thus may be preheated by direct contact and mixture with the hot relief gases and vapors from the digester. Again, the recovered clarified liquor may be utilized as an acid make-up component. For this purpose the reclaimed liquor may be mixed with the milk of lime which is reacted with the $SO_2$ gas produced in the burner. The amount of the clarified liquor mixed with the milk of lime, as will be appreciated, is so adjusted as to insure the proper density of the resultant acid liquor; that is to say, the milk of lime and reclaimed liquor are so respectively proportioned as to insure the proper total, free and combined acid in the resulting liquor. In the event a limestone or tower system is used for acid make-up the reclaimed liquor may be pumped to the top of the towers and would thus replace a part of the water that is normally used in acid making.

It will be appreciated that the broader concepts of the invention may be effectuated in a number of specifically different processes. The efficacy of the process can be appreciated from a consideration of a typical treatment within the scope of the invention. A waste sulphite liquor was treated with an oxidizing agent, as described above, and the sludge separated from the filtrate. This liquor, having a beaume of 2.5 was mixed with fresh acid liquor in the proportion of three parts of reclaimed liquor to one part of fresh liquor. The fresh liquor analyzed as follows: free acid, 2.43%, combined acid 1.97%, total acid 4.40%, after mixing, the liquor analyzed as follows: free acid .70%, combined acid .29% and total acid .99%. To this mixture then was added one half part of lime water (9.9 Bè). Sulphur dioxide gas was passed through the solution for a period of about thirty-five minutes after which a catalyst ($CaCl_2$) was added, and the gas was passed through the mixture for an additional fifteen minute period. After such treatment the solution was analyzed and was found to contain 3.39% free acid, 2.4% combined acid and 5.79% total acid. The final solution was free from suspended lime and had a clear amber color. The color indicated the presence of some organic matter in highly dispersed form but cooking test showed that it did not inhibit the digestive efficiency of the acid.

It will be appreciated that the possibility of producing such a high acid liquor insures marked economies in pulping operations. With this type of digestion reagent and utilizing it in preheated condition and under high pressure it is possible to reduce the typical cooking cycle to four and one-half hours to five hours while reemploying a solution which has heretofore been discarded.

In a preferred method of operation the temperature of the improved cooking liquor is raised to about 150° C. before passing it to the digester. The liquor at this temperature is circulated through the digester without adding steam to the material being cooked. For this purpose the liquor may be circulated to and from the digester and through a heater located externally of the digester in which the temperature of the liquor is raised so as to maintain the temperature of the liquor in the digester at substantially 150° C.

It has been found that by this method of treatment valuable chemical constituents of the waste liquor may be recovered and utilized for digestion. The complexity of the material treated and the difficulty of ascertaining precisely the reactions which occur prevent any accurate statement of the mechanism of the process. From observations made, however, it would appear that the treatment modifies the fat content of the liquor and permits its removal prior to use of the clear liquor in the digestion step. It may also be that the treatment advantageously modifies the equilibrium existing between the chemically "bound" and the chemically "free" $H_2SO_3$ in the liquor thus permitting a recovery of a relatively large amount of the sulphonic acid in the clarified liquor. Whatever may be the mechanism of the reactions involved it is found that the described treatment does produce a solution substantially free from ligneous material which may be employed effectively for digestion.

It will be understood that, whenever advisable, the waste liquor may be subjected to any desired degree of concentration prior to the treatment described. For this purpose simple or vacuum distillation may be used.

The precipitated matter which is separated may be treated by any suitable method to produce marketable products therefrom as for example, adsorption on different types of pulp such as groundwood, kraft, unbleached sulphite, unbleached soda, unbleached sulphate and the like, to produce paper stock or by reaction with phenol to produce synthetic plastics. The treatment described therefore provides at the one time a method of recovering a valuable chemical solution and removing the lignin produces another product of potential value.

While a perferred modification of the invention has been described it is to be understood that this is given as illustrative of the principle of the invention and not as limiting it to the particular method described.

I claim:

1. A process of producing cellulosic pulp which comprises digesting cellulosic material with sulphite liquor in a digestion zone, withdrawing spent liquor from the zone after completion of the digestion; treating the spent liquor with an oxidizing agent separating the solid material which is formed from the liquor, treating said liquor with a precipitating agent, separating the clear liquor from the precipitate, and employing the separated liquor for digestion.

2. A process of producing cellulosic pulp which comprises digesting cellulosic material with sulphite liquor in a digestion zone, withdrawing spent liquor from the zone after completion of the digestion; treating the spent liquor with a bleach liquor and then with a precipitating agent, separating the clear liquor from the precipitate, and employing the separated liquor for digestion.

3. A process of producing cellulosic pulp which comprises digesting cellulosic material with sulphite liquor in a digestion zone, withdrawing spent liquor from the zone after completion of the digestion; treating the spent liquor with a bleach liquor and then with sodium chloride, separating the precipitated matter from the solution and employing the separated liquor for digestion.

4. A process of producing cellulosic pulp which comprises digesting cellulosic material with hot bisulphite liquor and during digestion absorbing evolved gases and vapors in a body of digestion liquor maintained in an accumulator, withdrawing spent liquor from the digestion zone after the termination of the digestion; treating the spent liquor with an oxidizing agent and then with a lignin precipitating agent, separating the clear liquor from the precipitate and passing it to the accumulator for admixture with fresh liquor.

5. A process of producing cellulosic pulp which comprises digesting cellulosic material with hot bisulphite liquor and during digestion absorbing evolved gases and vapors in a body of digestion liquor maintained in an accumulator, withdrawing spent liquor from the digestion zone after the termination of the digestion; treating the spent liquor with a bleach liquor and then with sodium chloride, separating the clear liquor from the precipitate and passing it to the accumulator for admixture with fresh liquor.

6. In the production of bisulphite pulp that improvement which comprises treating the waste liquor with an oxidizing agent and then with a precipitating agent which is effective to precipitate lignin, separating the precipitated matter from the solution and utilizing the clear liquor as a digestion reagent.

7. In the production of bisulphite pulp that improvement which comprises treating the waste liquor with an oxidizing agent and then with a precipitating agent which is effective to precipitate lignin, separating the precipitated matter from the solution and utilizing the clear liquor, in admixture with fresh bisulphite, as a digestion reagent.

8. A process of producing a kraft paper stock which comprises treating spent sulphite liquor with a bleach liquor and then with a precipitating agent, filtering the treated liquor in contact with a kraft pulp and recovering said pulp together with associated materials adsorbed thereon.

9. A process of producing cellulosic pulp which comprises digesting cellulosic material with sulphite liquor in a digestion zone, withdrawing spent liquor from the zone after completion of the digestion; treating the spent liquor with an oxidizing agent and then with a precipitating agent, separating the clear liquor from the precipitate by contacting with a kraft pulp, employing the separated liquor for further sulphite liquor digestion and employing the kraft pulp with its contained filtered solids as a kraft paper stock.

10. In the production of bisulphite pulp that improvement which comprises treating the sulphite waste liquor with a precipitating agent, separating the precipitated matter from the liquor by contacting the treated waste liquor with cellulosic pulp, utilizing the filtrate, in admixture with fresh bisulphite mixture as the digestion reagent for the production of bisulphite pulp and utilizing said cellulosic filtering material as a paper stock.

THOMAS LEONIDAS DUNBAR.

REFERENCES CITED

The following references are of record in the file of this patent:

UNITED STATES PATENTS

| Number | Name | Date |
|---|---|---|
| 1,057,416 | Ellis | Apr. 1, 1913 |
| 1,130,817 | Hedden | Mar. 9, 1915 |
| 1,155,256 | Marchand | Sept. 28, 1915 |
| 1,236,948 | Landmark | Aug. 14, 1917 |
| 1,445,603 | Robeson | Feb. 13, 1923 |
| 1,716,623 | Collins | June 11, 1929 |
| 1,737,590 | Johnsen | Dec. 3, 1929 |
| 1,795,758 | Bradley | Mar. 10, 1931 |
| 1,881,557 | Wolfgang | Oct. 11, 1932 |

OTHER REFERENCES

Technical Association Papers, Pulp and Paper Industry, Series IX, pages 159, 161, 162, 166, 167, 169 and 170 (1925–1926).

Technical Association Papers, Pulp and Paper Industry, Series 15, pages 232–234 (1931–1932).

Technical Association Papers, Pulp and Paper Industry, Series 19, pages 498 and 508 (1936).